(12) United States Patent
Meyer

(10) Patent No.: US 7,500,814 B2
(45) Date of Patent: Mar. 10, 2009

(54) CONVEYOR POSITIONING SYSTEM FOR AN AIR CART IN AN AGRICULTURAL SEEDER

(75) Inventor: Bradley J. Meyer, Bismarck, ND (US)

(73) Assignee: Deere & Company, Moline, IL (US)

( * ) Notice: Subject to any disclaimer, the term of this patent is extended or adjusted under 35 U.S.C. 154(b) by 424 days.

(21) Appl. No.: 11/247,520

(22) Filed: Oct. 11, 2005

(65) Prior Publication Data

US 2007/0079739 A1  Apr. 12, 2007

(51) Int. Cl.
| B65F 9/00 | (2006.01) |
| B65G 1/00 | (2006.01) |
| B65G 65/00 | (2006.01) |
| B65G 67/00 | (2006.01) |
| B60P 1/00 | (2006.01) |

(52) U.S. Cl. .................. 414/327; 414/343; 414/391; 414/398; 414/523; 414/526; 414/528; 414/920; 198/311; 198/317; 198/318; 198/861.4

(58) Field of Classification Search ................ 414/523, 414/528, 327, 343, 390, 391, 393, 398, 526, 414/519, 520, 920; 198/311, 317, 813, 861.4, 198/312, 318
See application file for complete search history.

(56) References Cited

U.S. PATENT DOCUMENTS

| 4,742,938 A | 5/1988 | Niewold | 222/381 |
| 5,108,249 A | 4/1992 | Kinzenbaw et al. | 414/523 |
| 5,831,539 A | 11/1998 | Thomas et al. | 340/674 |
| 5,831,542 A | 11/1998 | Thomas et al. | 340/684 |
| 5,888,044 A | 3/1999 | Baskerville | 414/523 |
| 5,979,343 A | 11/1999 | Gregor et al. | 111/175 |
| 6,093,926 A | 7/2000 | Mertins et al. | 250/222.1 |

Primary Examiner—Christopher J. Novosad
(74) Attorney, Agent, or Firm—Taylor & Aust, P.C.

(57) ABSTRACT

An air cart for use in an agricultural seeder includes a frame; a material tank carried by the frame; an arm pivotally coupled with the frame; a conveyor coupled with the arm for conveying material to the tank; and a hydraulic positioning system coupled with the conveyor for automatically moving the conveyor to a selected one of a plurality of predetermined positions.

15 Claims, 3 Drawing Sheets

CONVEYOR POSITIONING SYSTEM FOR AN AIR CART IN AN AGRICULTURAL SEEDER

FIELD OF THE INVENTION

The present invention relates to agricultural seeders, and, more particularly, to conveyor systems for air carts associated with such seeders.

BACKGROUND OF THE INVENTION

Air seeders are commonly towed by a traction unit, e.g., an agricultural tractor, to apply seed and/or fertilizer to a field. An air seeder has as a primary component a wheeled air cart which includes one or more frame-mounted tanks for holding material, typically seed and/or fertilizer. It is generally advantageous to tow an air cart in combination with a tilling implement, one behind the other, to place the seed and fertilizer under the surface of the soil. Air seeders generally include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

An air cart as described above typically includes a conveyor in the form of an auger or belt which is primarily used for loading the one or more tanks, but may also be used for unloading the one or more tanks. Such conveyors may be long and heavy, and thus are usually movably mounted to the frame of the air cart so that the operator is not required to lift and move the entire weight of the conveyor. Nonetheless, such conveyors still remain difficult for some operators to position for loading, unloading and transport, especially with wind or on sidehill terrain.

What is needed in the art is an air cart with a conveyor that can be simply, quickly and easily positioned at loading, unloading and transport positions.

SUMMARY OF THE INVENTION

The present invention provides an air cart having a hydraulic positioning system which automatically moves a conveyor to a selected predetermined position stored in a memory for loading, unloading or transport.

The invention comprises, in one form thereof, an air cart for use in an agricultural seeder, including a frame; a material tank carried by the frame; an arm pivotally coupled with the frame; a conveyor coupled with the arm for conveying material to the tank; and a hydraulic positioning system coupled with the conveyor for automatically moving the conveyor to a selected one of a plurality of predetermined positions.

The invention comprises, in another form thereof, a method of operating an agricultural seeder, including the steps of: providing an air cart including a frame, at least one material tank carried by the frame, a conveyor coupled with the frame for conveying the material, and a hydraulic positioning system coupled with the conveyor; selecting one of a plurality of predetermined positions of the conveyor; and actuating the hydraulic positioning system to automatically move the conveyor to the selected position.

DETAILED DESCRIPTION OF THE INVENTION

Figure 1:
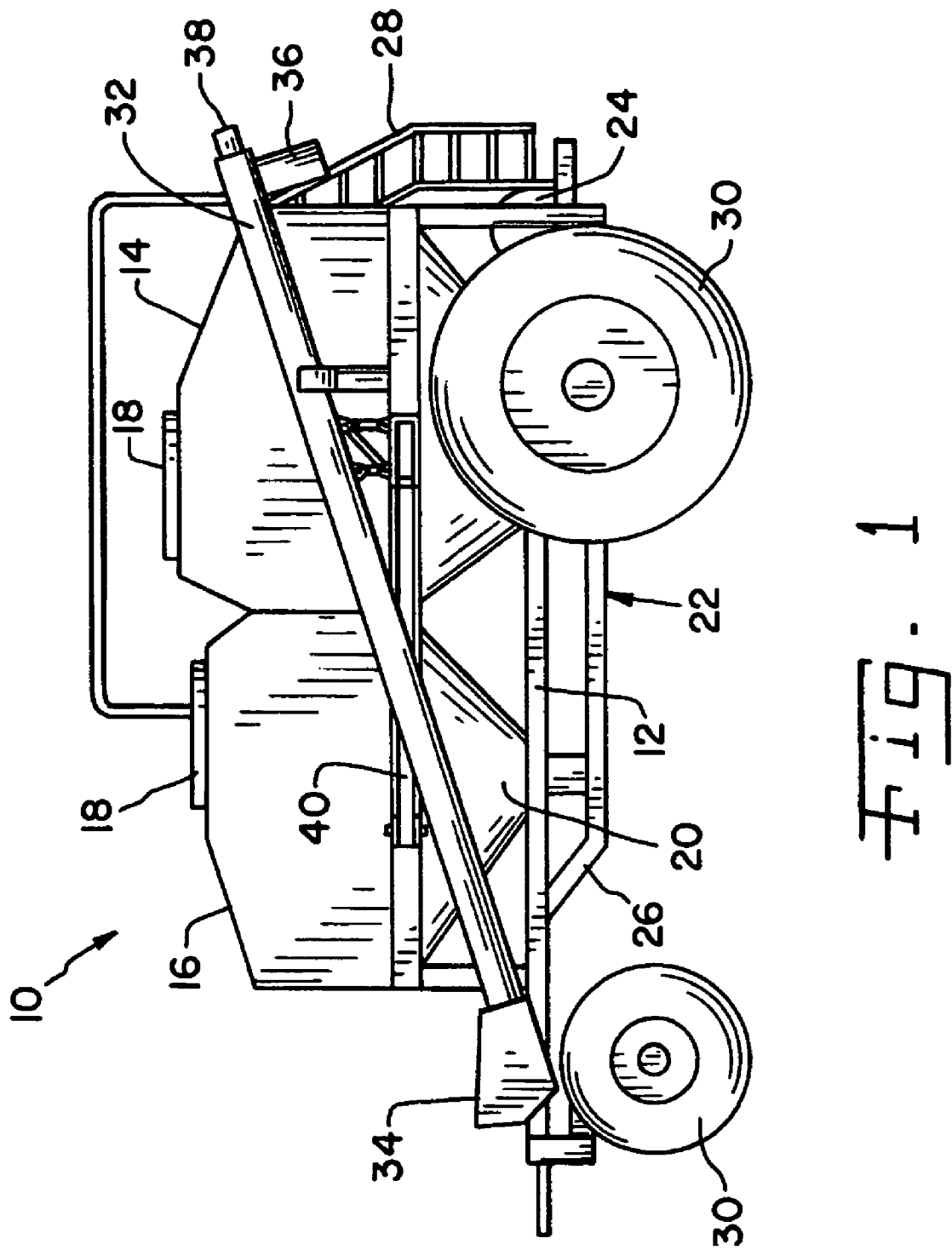
FIG. 1 is a side view of an embodiment of an air cart of the present invention with the conveyor in a transport position.
Figure 2:
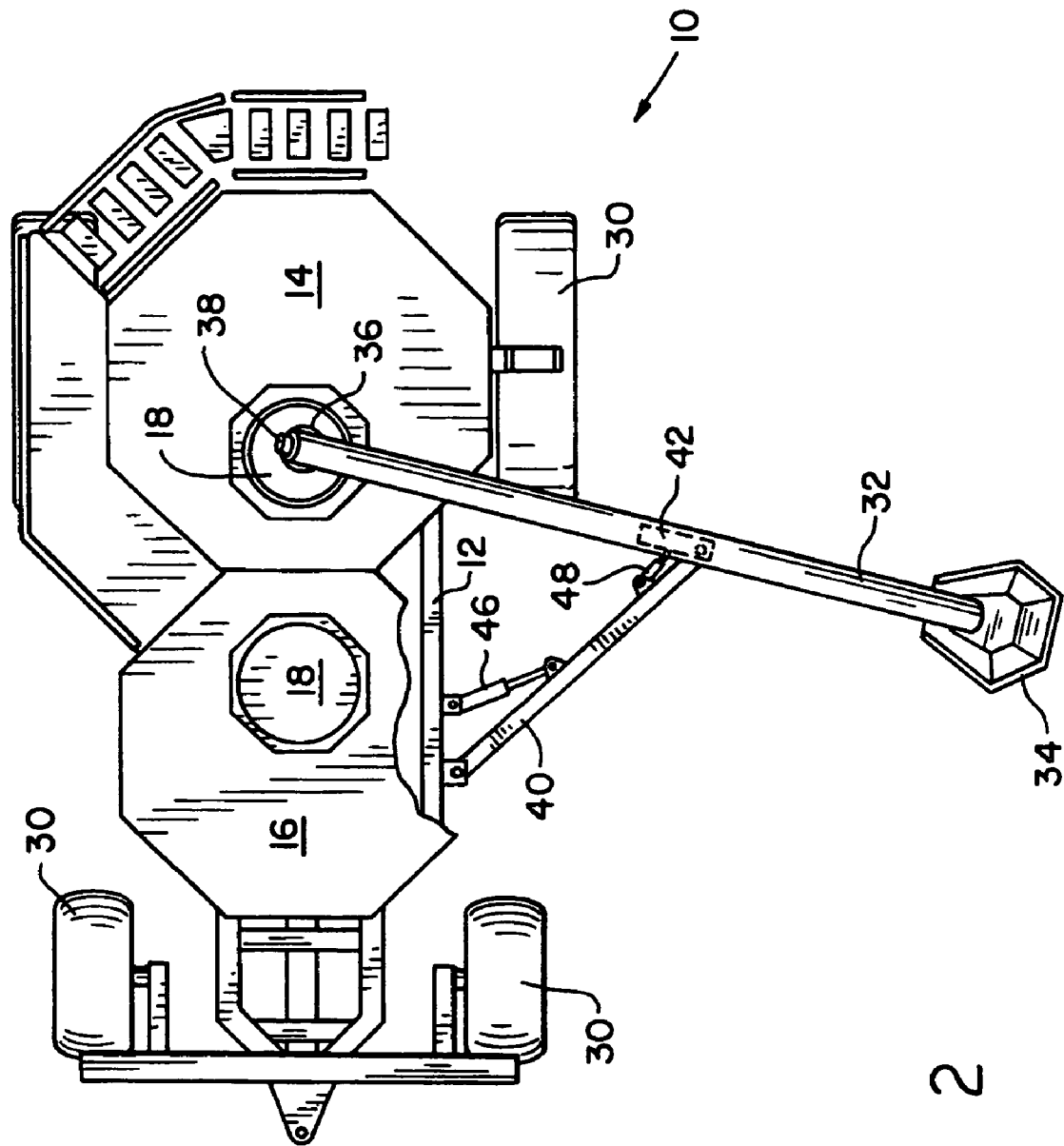
FIG. 2 is a top view of the air cart of FIG. 1 with the conveyor in a loading position.
Figure 3:
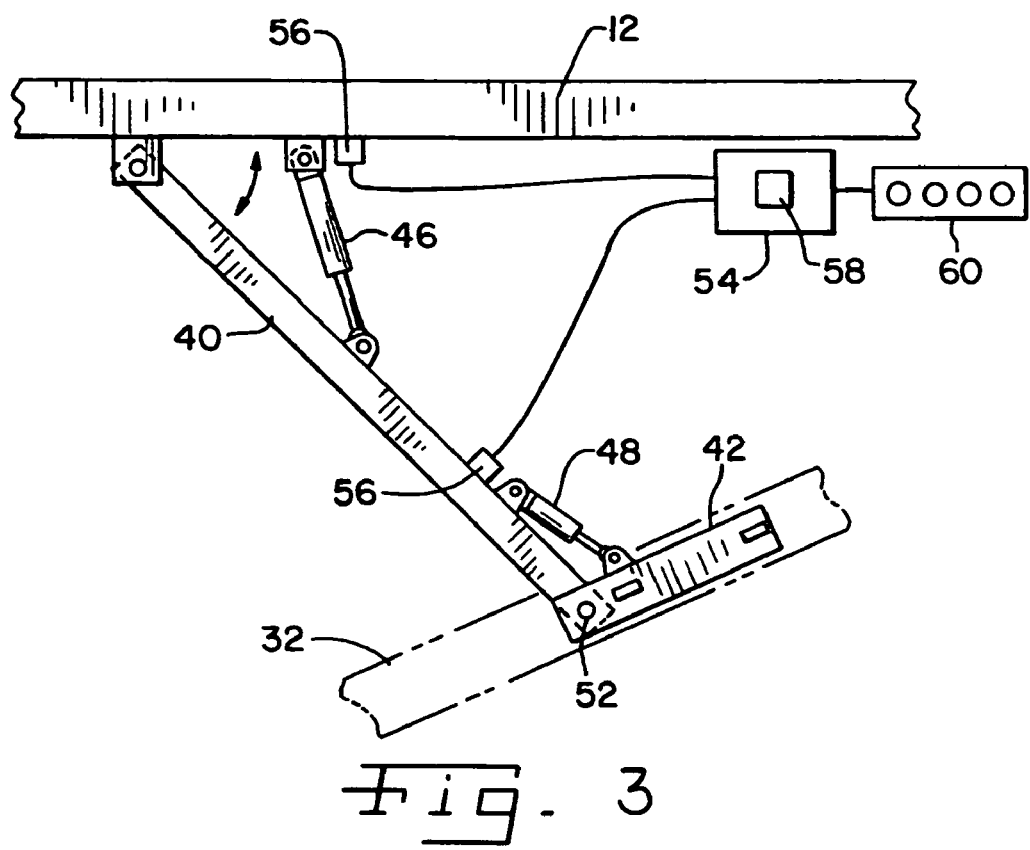
FIG. 3 is a top, fragmentary view of a portion of the air cart shown in FIGS. 1 and 2.

Referring now to the drawings, and more particularly to FIGS. 1 and 2, there is shown an embodiment of an agricultural material handling implement in the form of an air cart 10 for use in an air seeder. Air cart 10 typically is pulled behind a tillage implement (not shown) including a number of openers for forming parallel seed trenches in the soil in which the singulated seeds are deposited in known manner. Air cart 10 may also be configured as a forecart which is pulled in front of the tillage implement by a traction unit such as a tractor (not shown).

Although configured as an air cart in the embodiment shown, the agricultural implement may also be in the form of a different type of implement which carries a material which can by conveyed, such as a gravity wagon, planter, etc.

Air cart 10 generally includes one or more tanks which hold a material to be deposited in the seed trenches formed in the soil, such as seed and/or fertilizer. In the embodiment shown, air cart 10 includes a first tank 14 and second tank 16. First tank 14 and second tank 16 each include an inlet 18 for receiving material, and an outlet 20 for discharging material to pneumatic distribution system 22 also carried by frame 12. Pneumatic distribution system 22 includes a centrifugal fan 24 which blows air at a predetermined flow rate and pressure through air distribution lines 26 to the tillage implement ahead of air cart 10.

Frame 12 also carries a stair and walkway 28, wheels 30 and conveyor 32. In the embodiment shown, conveyor 32 is in the form of an auger, but may also be in the form of a belt if desired. Conveyor 32 is primarily used to load material into tanks 14 and 16, but may also be used to unload material remaining within tanks 14 and 16 after planting is complete. Conveyor 32 includes an inlet 34 in the form of a loading hopper, an outlet 36 in the form of an unloading chute, and a hydraulic motor 38 adjacent outlet 36 for driving an internal flighting (not shown).

Conveyor 32 is generally moveable in three primary directions, i.e., toward and away from frame 12, up and down, and in a rotational direction about a generally vertical axis. To that end, a first arm 40 is pivotally coupled with frame 12. The outboard end of first arm 40 is moveable toward and away from frame 12 through the pivotal action, and is itself pivotally coupled with a second arm 42.

Figure 4:
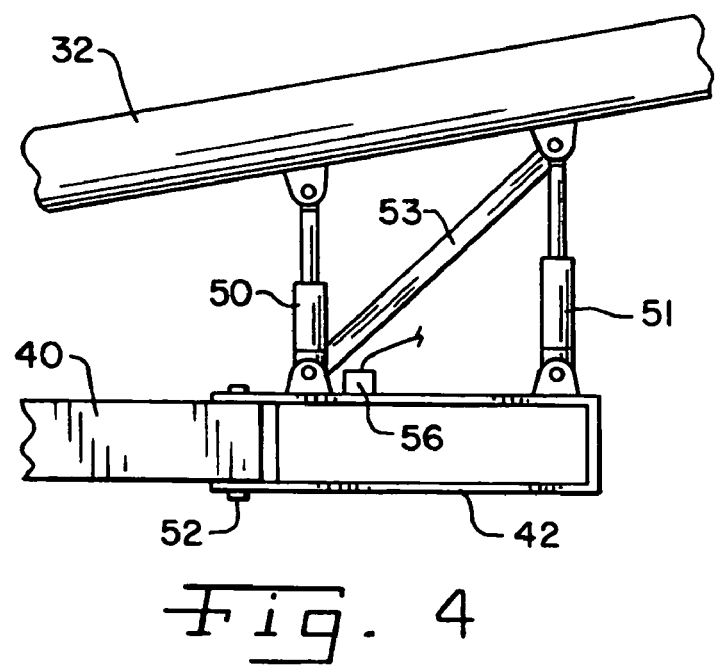
FIG. 4 is a side, fragmentary view of a portion of the air cart shown in FIGS. 1-3.

A hydraulic positioning system including a first hydraulic cylinder 46, second hydraulic cylinder 48, third hydraulic cylinder 50 and fourth hydraulic cylinder 51 effects movement of conveyor 32 in the three primary movement directions noted above. First hydraulic cylinder 46 is coupled between first arm 40 and frame 12 to effect the pivotal movement therebetween in a generally horizontal plane. Second hydraulic cylinder 48 is coupled between first arm 40 and second arm 42 to effect rotational movement of conveyor 32 about generally vertical pivot pin 52 interconnecting first arm 40 and second arm 42. Third hydraulic cylinder 50 and fourth hydraulic cylinder 51 are coupled between second arm 42 and the bottom of conveyor 32 to effect up and down movement of conveyor 32. Third hydraulic cylinder 50 and fourth hydraulic cylinder 51 may be operated sequentially or concurrently to effect up and down motion and up and down pivoting of conveyor 32. A cross bar linkage 53 extending between the bottom link of hydraulic cylinder 50 and the top link of hydraulic cylinder 51 prevents undesirable side to side motion of conveyor 32 (in the plane of the drawing shown in FIG. 4), while still allowing generally vertical and pivoting motion of conveyor 32.

According to an aspect of the present invention, conveyor 32 is moved in the primary movement directions using hydraulic cylinders rather than manually moved as is the case with known designs. Additionally, the hydraulic positioning system senses a current position of conveyor 32 and automatically moves conveyor 32 to a selected one of a plurality of positions including one or more loading positions, one or more unloading positions, and a transport position. More particularly, an electrical processing circuit 54 is carried by air cart 10 and may be digital or analog based. The exact mounting position of electrical processing circuit 54 on air cart 10 can be selected depending upon the application. Electrical processing circuit 54 is electrically coupled with one or more sensors 56 for sensing the current position of conveyor 32. In the embodiment shown, sensors 56 may be potentiometers that are coupled with a frame member adjacent a hydraulic cylinder and sense rotational movement of the cylinder relative to the frame member during use. It may also be desirable to place a sensor under conveyor inlet 34 to sense contact with the ground. Electrical processing circuit 54 is also electrically coupled with an indicator 58, preferably in the form of a visual display, for indicating to an operator the position of conveyor 32. Visual display 58 may be incorporated, e.g., in a GPS based monitoring and display system in the operators cab of the tractor. Alternatively, visual display 58 may be integrally incorporated into electrical processing circuit 54 on board air cart 10. Of course, other possibilities are also available, such as a dedicated visual display in the operators cab.

Electrical processing circuit 54 is also electrically coupled with an input device 60 which may include a number of depressible buttons corresponding to the number of predetermined positions of conveyor 32. In the embodiment shown, input device 60 is mounted directly to air cart 10 for access by an operator on the ground. Input device 60 may separately or concurrently be provided within the operators cab through the use of a dedicated device or incorporation into another device (such as a touch screen on a GPS system).

During operation, the various air and electrical connections of air cart 10 are coupled with the tillage implement and tractor as appropriate. Since air cart 10 includes a first tank 14 and second tank 16, conveyor 32 is moveable to a first loading position in which conveyor outlet 36 is positioned above inlet 18 of first tank 14 (FIG. 2), and a second loading position in which conveyor outlet 36 is positioned above inlet 18 of second tank 16. Conveyor 32 may also be positioned at an unloading position in which conveyor inlet 34 is positioned below a clean out plate (such as at the bottom of the air distribution manifold below second tank 16) for unloading unused material. Conveyor 32 is also moveable to the transport position shown in FIG. 1 after a loading or unloading operation. Conveyor 32 is moved to a selected position by depressing a corresponding button on an input device 60 located on board air cart 10 or in the operators cab. The position of conveyor 32 is sensed and electrical processing circuit 54 controls first hydraulic cylinder 46, second hydraulic cylinder 48 and/or third hydraulic cylinder 50 in a concurrent or sequential manner to move conveyor 32 to the selected position. The control logic necessary for controlling movement of conveyor 32 may be effected using suitable electrical hardware, software and/or firmware. Depending upon the contour of the ground or other factors, it may be desirable or necessary to place conveyor 32 in a "float" position after being moved to the selected position such that the bottom end of conveyor 32 slowly moves to and rests upon the ground. After a selected loading or unloading operation, the button corresponding to the transport position may be depressed and conveyor 32 is automatically moved back to the transport position shown in FIG. 1.

Having described the preferred embodiment, it will become apparent that various modifications can be made without departing from the scope of the invention as defined in the accompanying claims.

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. An agricultural implement, comprising:
   a frame;
   at least one material tank carried by said frame;
   a conveyor coupled with said frame for conveying the material;
   a hydraulic positioning system coupled with said conveyor for moving said conveyor in at least two directions to a selected one of a plurality of predetermined positions; and
   at least one sensor for sensing a position of said conveyor.

2. The agricultural implement of claim 1, wherein said at least two directions include at least two of:
   a generally horizontal direction;
   a generally vertical direction; and
   a rotational direction.

3. The agricultural implement of claim 1, further including at least one arm interconnecting said conveyor with said frame.

4. The agricultural implement of claim 3, wherein said at least one arm includes a first arm coupled with a second arm, and said positioning system includes a first hydraulic cylinder coupled between said first arm and said frame, and a second hydraulic cylinder coupled between said first arm and said second arm.

5. The agricultural implement of claim 4, wherein said first arm and said second arm are coupled together using a generally vertical pivot pin.

6. The agricultural implement of claim 1, wherein each said tank has an inlet and said conveyor has an outlet, said positioning system configured for positioning said conveyor outlet relative to a selected tank inlet.

7. The agricultural implement of claim 1, including an outlet associated with at least one said tank, said conveyor having an inlet, said positioning system configured for positioning said conveyor inlet relative to said tank outlet.

8. The agricultural implement of claim 1, including an indicator for indicating a position of said conveyor.

9. The agricultural implement of claim 8, wherein said indicator comprises a visual display.

10. The agricultural implement of claim 1, wherein said conveyor comprises one of an auger and a belt.

11. The agricultural implement of claim 1, wherein said agricultural material handling implement comprises an air cart.

12. The agricultural implement of claim 1, wherein each said material tank carries at least one of seed and fertilizer.

13. The An agricultural implement, comprising:
a frame;
at least one material tank carried by said frame;
a conveyor coupled with said frame for conveying the material; and
a hydraulic positioning system coupled with said conveyor for moving said conveyor in at least two directions to a selected one of a plurality of predetermined positions;
at least one arm interconnecting said conveyor with said frame, said at least one arm includes a first arm coupled with a second arm, and said positioning system includes a first hydraulic cylinder coupled between said first arm and said frame, and a second hydraulic cylinder coupled between said first arm and said second arm; and
a third hydraulic cylinder coupled between said second arm and said conveyor.

14. An agricultural implement, comprising:
a frame;
at least one material tank carried by said frame;
a conveyor coupled with said frame for conveying the material; and
a hydraulic positioning system coupled with said conveyor for moving said conveyor in at least two directions to a selected one of a plurality of predetermined positions, said positioning system including at least two hydraulic cylinders coupled with said conveyor, and including an electrical processing circuit coupled with each said hydraulic cylinder, said electrical processing circuit actuating at least one said hydraulic cylinder to position said conveyor at one of said plurality of predetermined positions.

15. The agricultural implement of claim 14, wherein said at least one tank includes a first tank and a second tank, each of said first tank and said second tank including an inlet and an outlet, said conveyor including an inlet and an outlet, said one of a plurality of predetermined positions including one of:
a first position in which said conveyor outlet is positioned in association with said first tank inlet;
a second position in which said conveyor outlet is positioned in association with said second tank inlet;
a third position in which said conveyor inlet is positioned in association with at least one of said first tank outlet and said second tank outlet; and
a transport position.

* * * * *